United States Patent [19]

Jordan

[11] Patent Number: 5,167,503

[45] Date of Patent: Dec. 1, 1992

[54] PRESCHOOLER'S TEACHING AID GAME

[76] Inventor: Herbert W. Jordan, 504 E. Indian School Rd., Litchfield Park, Ariz. 85340

[21] Appl. No.: 870,290

[22] Filed: Apr. 17, 1992

[51] Int. Cl.[5] .......................... G09B 19/00; A63F 3/00
[52] U.S. Cl. ................... 434/128; 273/249; 273/146; 434/159
[58] Field of Search ............................ 434/128, 159; 273/249 X, 243, 146 X, 250–254

[56] References Cited

U.S. PATENT DOCUMENTS

| | | | |
|---|---|---|---|
| 1,480,360 | 1/1924 | Agee, Jr. | 273/249 |
| 3,115,345 | 12/1963 | De Temple | 273/249 |
| 3,977,679 | 8/1976 | Magiera | 273/249 |
| 4,042,245 | 8/1977 | Zarour | 273/249 |
| 4,188,734 | 2/1980 | Rich | 434/159 |
| 5,090,706 | 2/1992 | Hokanson | 273/146 X |

FOREIGN PATENT DOCUMENTS

| | | | |
|---|---|---|---|
| 2738798 | 3/1979 | Fed. Rep. of Germany | 273/249 |
| 5073 | 3/1901 | United Kingdom | 273/249 |

Primary Examiner—Gene Mancene
Assistant Examiner—L. Thomas

[57] ABSTRACT

An educational game has a playing board on which is imprinted a pathway. The pathway contains a plurality of segments, each segment being separated, one from the other by an object image portion. Each segment is sub-divided into spaces bearing alpha-numeric indicia with each segment being a different selected color. There is a die associated with each of the segments and which bears the color of an associated segment. Each such die bears the alpha-numeric indicia associated with that given colored segment. On one face of each die is an object image as depicted in the object image portions between the primary segments of the pathway on the playing board. A child learns the colors of the segments, the colors of each of the dice employed, and the names of the objects which appear in the object spaces and on the object face of each die. Play is easily learned by the preschool children. Also the teaching of the recognition of colors by the actual color and the color names, as well as the names by the alpha-numeric indicia is supplemented by adult intervention.

13 Claims, 2 Drawing Sheets

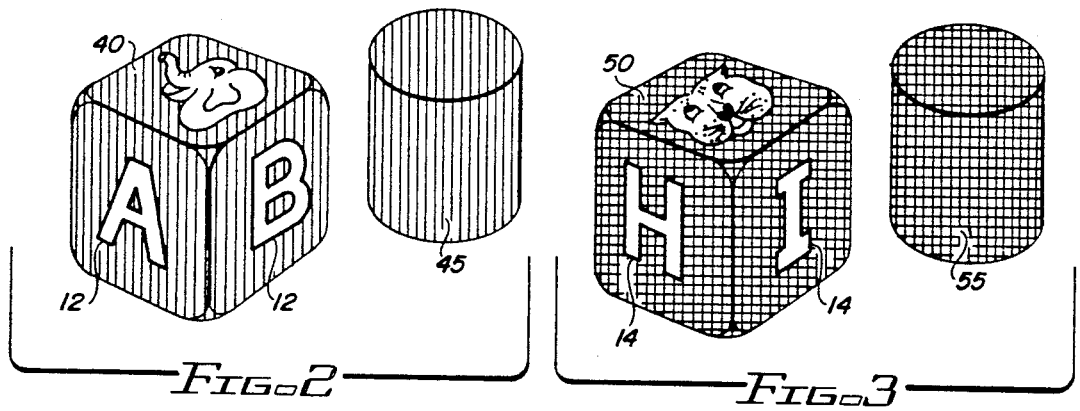
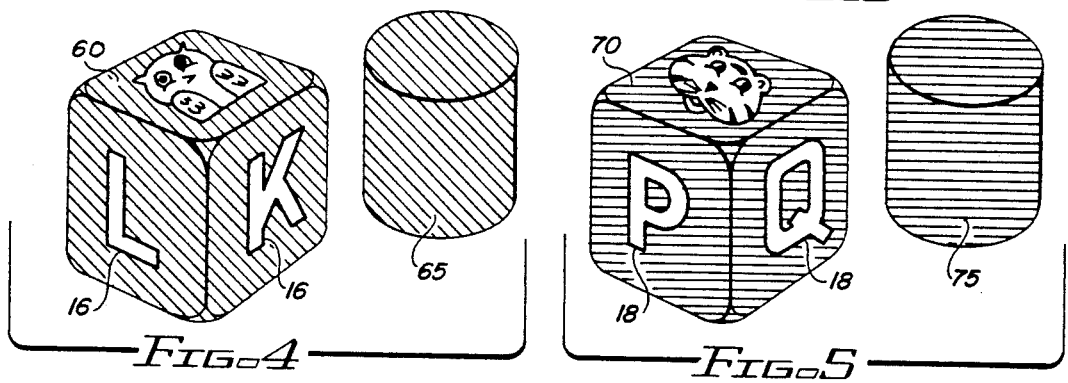
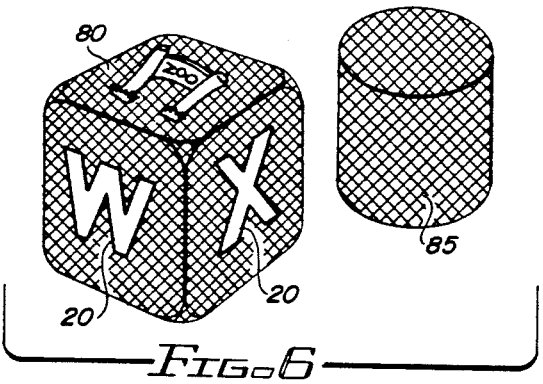
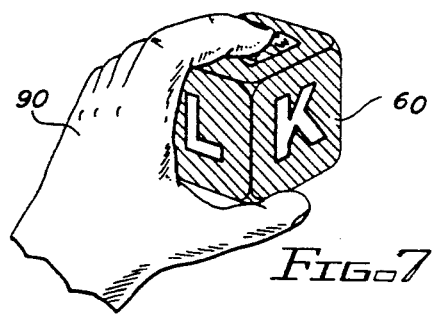
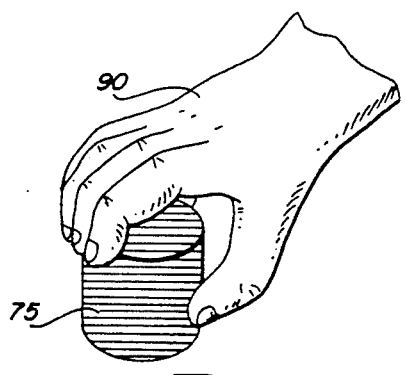

PRESCHOOLER'S TEACHING AID GAME

BACKGROUND

1. Technical Field of the Invention

The invention relates to educational games used by preschool children. In particular, the invention relates to a game intended to teach the children their letters, numbers and colors. The game requires no prior knowledge of reading, counting, or naming colors.

2. Prior Background Art

Their are many games commercially available which have educational aspects. Many such games require that the child who will play the game shall have a rudimentary ability to read or count or recognize colors. No games are known of in the prior art which enable a player to come to the playing board and enjoy play at that board without such rudimentary knowledge wherein numbers, or letters, and colors provide important aspects of playing at the board.

It is the intent of the present invention that, with very little adult supervision, a child of preschool age and experience will come to learn their letters, numbers, and colors in the course of playing the game.

SUMMARY DESCRIPTION OF THE INVENTION

The invention is an educational game made up of a playing board. There is a pathway indicated on the playing board. A plurality of segments is presented, in succession, along the pathway, each comprising a portion of the pathway. Each of the segments comprises a plurality of sub-segments, each bearing a distinguishing, identifying indicia.

Included in the game are a plurality of dice. Each die of the plurality has means for identifying a selected die with a selected one of the plurality of segments along the pathway. There are a plurality of planar faces on each die, each bearing distinguishing, identifying indicia. A plurality of the distinguishing, identifying indicia are identical with the indicia borne on the sub-segments of the selected die. Thus, upon the roll of a given die, a particular sub-segment within a particular segment of the pathway will be designated.

The game board includes a plurality of segment-separating portions of the pathway, a selected one of the plurality of portions being positioned between a selected pair of the plurality of segments along the pathway. Each of the segment-separating portions of the pathway bears a distinguishing, object identifying indicia. And, a selected one of the planar faces on a selected one of the dice, has on a face the same the distinguishing object identifying indicia as appears on the segment-separating portion of the pathway, the portion being adjacent the selected one of the plurality of segments with which the selected one of the dice is identified, whereby upon the roll of a given die a particular segment-separating portion of the pathway will be designated.

Each segment of the plurality of segments along the pathway includes means for distinguishing a selected one of the segments from all other the segments of the plurality, independent of the distinguishing identifying indicia borne by each sub-segment. The means for distinguishing a selected one of the segments from all other segments of the plurality comprises a selected, distinguishing coloration applied to the selected one of the segments. The means for identifying a selected die with a selected one of the plurality of segments comprises the die having the same selected, distinguishing coloration as applied to the selected one of the segments. Thus, the selected die is identified with the selected segment by the selected distinguishing coloration.

The game includes playing pieces to be positioned along the pathway on a particular sub-segment within a particular segment as designated by the roll of the die.

The game is also disclosed and claim by the process by which it is made, as follows:

a) providing a game board;

b) laying out a path of travel on the game board along which playing pieces will move in the course of play;

c) dividing the path of travel into a plurality of segments d) providing a plurality of dice;

e) identifying a selected one of each of the plurality of dice with a selected one of each of the plurality of segments of the path of travel;

f) subdividing the selected one of each of the segments of the path of travel (identified in step e above) into a plurality of sub-segments;

g) identifying each of the sub-sections with a distinguishing, identifying indicia; and h) imposing the distinguishing, identifying indicia upon the faces of the die identified in step e above.

h) further dividing the path of travel into a plurality of object identifying portions, and positioning one of each the object identifying portions between pairs of the segments produced by step c;

i) identifying each of the object identifying portions with a selected object identifying indicia;

j) imposing a selected one of the object identifying indicia on a selected one of the faces of a the selected one of the plurality of dice.

BRIEF DESCRIPTION OF THE DRAWINGS

FIGS. 2-6 each present a prospective view of a die, shaded to represent a selected coloration, and a playing piece used on the pathway on the surface of the playing board of FIG. 1. Among the dice represented in FIGS. 2-6 there is a die which matches, in coloration, a segment of the pathway of the playing board of FIG. 1.

FIG. 7 illustrates that each die is relatively large when compared to a small child's hand.

FIG. 8, in many respects similar to FIG. 7, shows the large size of the playing pieces relative to a child's hand.

DETAILS OF BEST MODE FOR CARRYING OUT THE INVENTION

Figure 1:
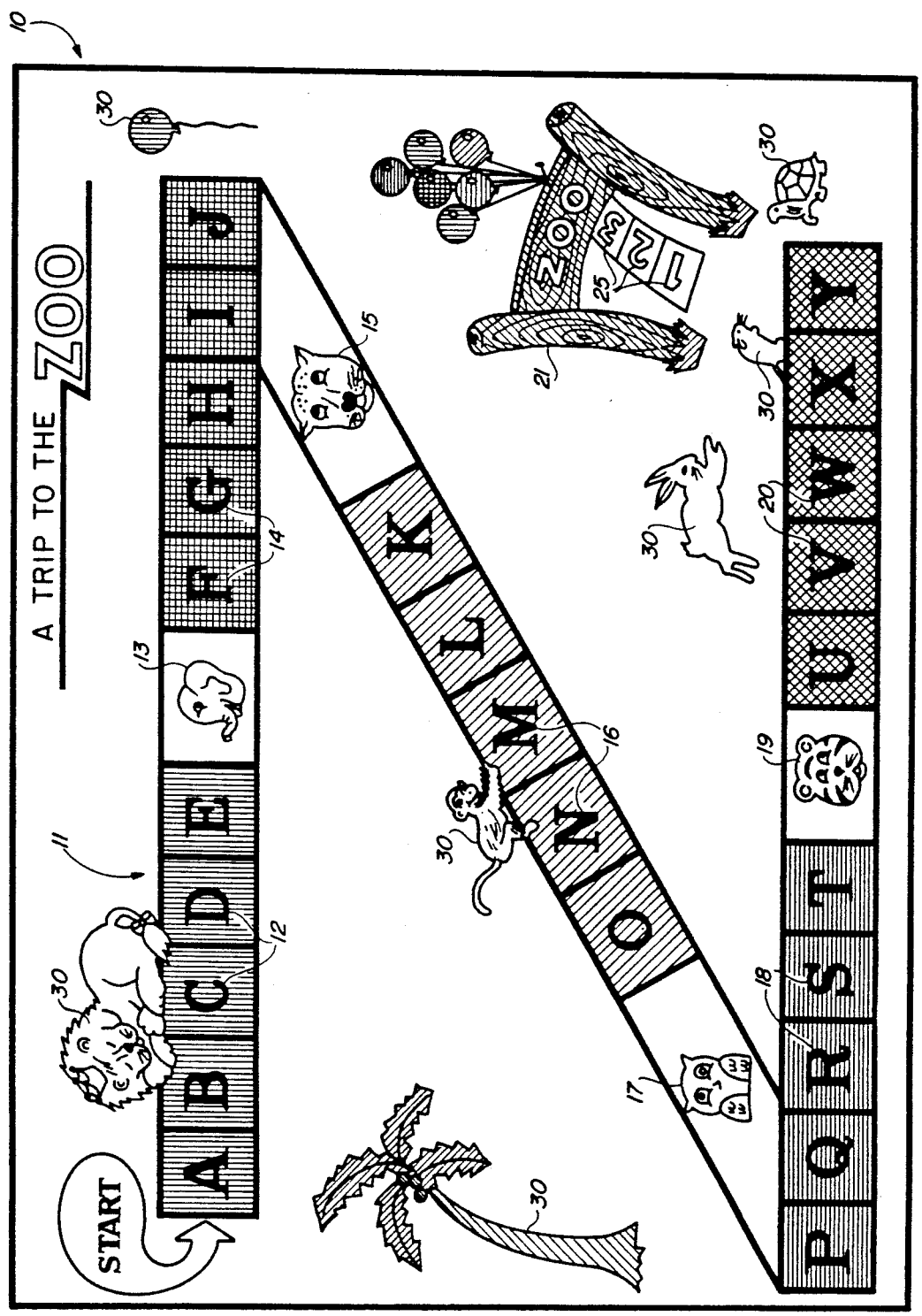
FIG. 1 is a plan view of a playing board having a surface on which a pathway is indicated for the placement of markers which are moved from position to position along said pathway. Exemplary shadings representative of selected coloring of segments of the pathways are presented for exemplary purposes only.

For purposes of promoting an understanding of the principles of the invention, reference will now be made to the embodiments illustrated in the drawings and specific language will be used to describe same. It will nevertheless be understood that no limitation of the scope of the invention is thereby intended. Alterations and modifications of the illustrated device are contemplated, as are such further applications of the principles of the invention as disclosed herein, as would normally occur to one skilled in the art to which the invention pertains.

FIG. 1 is a plan view of the playing surface of a game board selected to exemplify the principles whereby a child unfamiliar with the spoken alphabet, counting numbers, and naming the colors, may learn these skills in the course of playing a game with minimal adult supervision. Further, the game board is planned to teach the child to recognize various animals and objects in the course of play. On the playing board 10 of FIG. 1, a game path 11 is laid out. Because this embodiment of the game is being exemplified primarily with indicia representative of letters of the alphabet, path 11 is laid out in the form of the letter "Z." Path 11 has five primary segments, each color coded for a selected color; and each subdivided into sub-segments. Each sub-segment is identified by indicia representative of a letter of the alpha bet.

The first primary segment of path 11 is shaded to represent the color red and has the letter indicia A-E in its sub-segments. The second segment is shaded to represent the color yellow and bears the indicia for the letters F-J in its sub-segments. The third segment, shaded to represent the color green, bears the indicia of the letters K-O in its sub-segments. The next segment is shaded to represent the color blue and presents the lettered indicia P-T in its sub-segment. The final segment is shaded to represent the color orange. It bears the indicia U-Y in its sub-segments. As already noted, the indicia for the letter Z is presented in the pathway configuration of path 11.

Along the way of travel of path 11 are several object-presenting sub-segments which separate the various primary, colored segments. Thus, an elephant 13 follows the letter E and appears in the object presenting segment between the letter E and the letter F. A jaguar 15 is illustrated in the object presenting segment following the letter J and preceding the letter K. So too, an owl 17 follows the letter O and precedes the letter P. A tiger 19 appears between the letters T and U.

Additional objects 30 are illustrated at various places on playing board 10. These objects 30 present the child with an additional learning experience wherein the various objects are identified and provided with a name which can be drawn from memory and associated with the appropriate one of the objects 30.

It has been noted that the lettered indicia 12 for the letters A-E appear on playing board 10 against a red background. For playing on the red segment of the board, the die of FIG. 2 is provided to the child player. The indicia 12, the letters A-E, appear on each of five faces on die 40 of FIG. 2. On the sixth face is presented the image of elephant 13 which, on board 10, appears between the letters E and F.

The die 50 of FIG. 3 is colored yellow to match the background coloration of the segment on the pathway on which are presented the indicia 14 representative of the letters F-J. On each one of five faces of die 50 is presented one of the indicia 14 representative of the letters F-J. The sixth face of die 50 presents the jaguar 15 which appears on playing board 10 between the letters J and K.

In FIG. 4 is shown a die 60 which is shaded to represent the color green as is that segment on playing board 10 on which are presented the indicia 16 representative of the letters K-O. As before, the indicia 16 for the letters K-O are distributed and presented on the five faces of die 16. The owl 17, first seen on board 10 between the letters O and P appears on the sixth face of die 60.

In similar fashion die 70 is shaded to represent the color blue; the same as the background shade of the segment on which the indicia 18 for the letters PT are presented on playing board 10. These letters are imprinted about five faces of die 70. The image of the tiger 19 is presented on the sixth face of die 70. Finally, the die 80 is shaded to represent the color orange; the same as the background shade of the segment on which indicia 20 for the letters U-V are presented on playing board 10. The die bears the indicia U-Y, one each on its five faces. The object presented on its sixth face is the zoo entry gate 21 which appears as the goal on playing board 10. A final die, not shown but bearing indicia 25 on its faces, is representative of numerals and may be played by the child to enter through gate 21 of the zoo.

In playing the game, each player is assigned a playing piece such as those designated 45, 55, 65, 75, and 85 is FIGS. 2-6. Games designed for older children and adults will often use dice and playing pieces which tend to be so small that they are hard to manipulate by a child's small hands. In addition, such small pieces might be placed in a child's mouth and lead to choking of the child. To preclude such problems, the dice and the playing pieces employed in the present invention are made in a generous size as illustrated with the die 60 in FIG. 7 and the playing piece 75 in FIG. 8. These items are shown in scale relative to that of the child's hand, which will be manipulating these pieces. At the beginning of play, each child is assigned a playing piece, for example 45 or 55. As seen in the drawings of FIGS. 2-6 the playing pieces are shaded to indicate a selected color. The color of each individual playing piece presents an educational opportunity for instructing the child as to the actual color of the playing piece with which he is assigned. The child then identifies the playing piece as his own and learns to say the color name of that playing piece. To begin the game, the first player is instructed to pick up the die which agrees in color with the color of the first segment in pathway 11 on playing board 10. The first segment contains the indicia 12 with the letters A-E and is shaded to indicate the color red. The player will therefore be instructed to take red die 40, illustrated in FIG. 2, and to roll red die 40.

On five of the faces of die 40 the indicia A-E appear. If one of those letters comes up at the throw of the die, the player is instructed to move his playing piece, for example 45, to that sub-segment of path 11 bearing that indicia. Each player in turn will roll red die 40 and place his individual playing piece on the sub-segment the letter indicia indicated by the throw of the dice.

At his next turn, the original first player will roll the die again. He will again move his playing piece to the sub-segment which bears the letter indicia which comes up at the toss of the die. With the help of an adult the player will learn how to read the name of the letter which appears on the die and at which the player places his playing piece along pathway 11.

Play continues in this manner, from player to player, until one of the players rolls the die in a manner which causes the image of elephant 13 to appear on the die as rolled. The player moves his playing piece to that sub-segment of path 11 at which the elephant 13 is indicated. Thereafter that player selects the die which corresponds in color to the next segment of pathway 11. This next segment is shaded to represent the color yellow and the player will use yellow die 50. The indicia 14 in this segment represent the letters F-J and these indicia 14 appear on the various faces of die 50. One face of die 50 contains the image of jaguar 15. As before, play continues with the playing piece being placed on the sub-segment on which the letter indicia appears as is rolled on die 50. Play remains in that particular segment of path 11 until the player rolls the die so as to cause the image of jaguar 15 to come up on the die as thrown. Play then progresses, for that player, to the next segment.

Play continues in this manner with progress out of a given segment made only when the object image indicia, for example elephant 13, jaguar 15, owl 17, tiger 19, and zoo gate 21, appear on the die. With the guidance of an adult, the child learns to name the letter indicia which come up on the roll of each die, and to name the object which appears on the sixth face of each die. In selecting a particular die, for example one of dice 40, 50, 60, 70, or 80, the player is instructed in the color of the die and the color of the segment at which play is in progress.

In this way the player learns to visually recognize a color and to associate that color with the name given to the color. In the course of play the child's abilities to manipulate objects such as the dice and playing pieces are also exercised and implemented.

While the game has been described primarily in terms of alpha-graphic indicia, numeric indicia are readily employed and recommended. Thus, the numeric indicia 25 leading through zoo gate 21 may be used in conjunction with a die bearing such numeric indicia on its faces. The object spaces similar to those presently containing the images of animals, may be utilized with other object images which a child should have in his visual and speaking memories. Thus, the object segments might bear various types of flowers, various types of motor vehicles, various types of architecture, etc.

What has been described is a playing board on which is imprinted a pathway. The pathway contains a plurality of segments, each segment being separated, one from the other by an object image portion. Each segment is subdivided into spaces bearing alphanumeric indicia with each segment being a different selected color. There is a die associated with each of the segments and which bears the color of an associated segment. Each such die bears the alpha-numeric indicia associated with that given colored segment. On one face of each die is an object image as depicted in the object image portions between the primary segments of the pathway on the playing board. A child learns the colors of the segments, the colors of each of the dice employed, and the names of the objects which appear in the object spaces and on the object face of each die. Play is easily learned by preschool children. Also the teaching of the recognition of colors by the actual color and the color names, as well as the names of the alphanumeric indicia is supplemented by adult intervention.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, that which is claimed is:

1. An educational game comprising:
   a playing board;
   a pathway indicated on said playing board;
   a plurality of segments in succession along said pathway, each comprising a portion of said pathway;
   each said segment comprising a plurality of sub-segments, each sub-segment bearing a distinguishing, identifying indicia;
   a plurality of dice, each die of said plurality having means for identifying a selected die with a selected one of said plurality of segments along said pathway;
   a plurality of planar faces on each said die, each of said planar faces bearing distinguishing, identifying indicia such that plurality of said distinguishing, identifying indicia on a selected said die identified with a said selected one of said plurality of segments along said pathway is identical with the said indicia borne on said sub-segments of the identified of said pathway;
   whereby, upon the roll of a given die, a particular said sub-segment within a particular said segment of said pathway will be designated.

2. The game of claim 1 further comprising a playing piece to be positioned along said pathway on a particular said sub-segment within a particular said segment as designated by the roll of said die.

3. The game of claim 1 further comprising a plurality of segment-separating portions of said pathway, a selected one of said plurality of portions being positioned between a selected pair of said plurality of segments along said pathway.

4. The game of claim 3 wherein:
   each of said segment-separating portions of said pathway bears a distinguishing, object identifying indicia and;
   a selected one of said planar faces on a selected one of said dice, which die is identified with a selected one of said plurality of segments along said pathway, has on said face the same said distinguishing object identifying indicia as appears on the said distinguishing object identifying indicia as appears on the said segment-separating portion of said pathway, which portion is adjacent said selected one of said plurality of segments with which said selected one of said dice is identified;
   whereby upon the roll of a given die a particular said segment-separating portion of said pathway will be designated.

5. The game of claim 4 further comprising a playing piece to be positioned along said pathway on a particular said sub-segment within a particular said segment as designated by the roll of said die.

6. The game of claim 1 wherein said segment of said plurality of segments along said pathway includes means for distinguishing a selected one of said segments from all other said segments of said plurality independent of the said distinguishing identifying indicia borne by each said sub-segment.

7. The game of claim 6 wherein said means for distinguishing a selected one of said segments from all other said segments of said plurality of segments comprises said die having the same selected, distinguishing coloration as applied to said selected one of said segments,
   whereby said selected die is identified with said selected segment by the said selected distinguishing coloration.

8. The game of claim 7 further comprising a playing piece to be positioned along said pathway on a particular said sub-segment within a particular said segment as designated by the roll of said die.

9. The game of claim 7 further comprising a plurality of segment-separating portions of said pathway, a selected one of said plurality of portions being positioned between a selected pair of said plurality of segments along said pathway.

10. The game of claim 9 wherein;
   each of said segment-separating portions of said pathway bears a distinguishing, object identifying indicia and;
   a selected one of said planar faces on a selected one of said dice, which die is identified with a selected one of said plurality of segments along said pathway, has on said face the same said distinguishing object identifying indicia as appears on the said segment-separating portion of said pathway, which portion is adjacent said selected one of said plurality of segments with which said selected one of said dice is identified;
   whereby upon the roll of a given die a particular said segment-separating portion of said pathway will be designated.

11. The game of claim 10 further comprising a playing piece to be positioned along said pathway on a particular said sub-segment within a particular said segment as designated by the roll of said die.

12. An educational game produced by the process of
   a) providing a game board;
   b) laying out a path of travel on said game board along which playing pieces will move in the course of play;
   c) dividing said path of travel into a plurality of segments
   d) providing a plurality of dice;
   e) identifying a selected one of each of said plurality of dice with a selected one of each of said plurality of segments of said path of travel;
   f) subdividing said selected one of each of said segments of said path of travel, identified in step e above, into a plurality of sub-segments;
   g) identifying each of said sub-sections with a distinguishing, identifying indicia; and
   h) imposing said distinguishing, identifying indicia upon the faces of said die identified in step e above.

13. The game of claim 12 wherein the process of producing the game includes:
   h) further dividing said path of travel into a plurality of object identifying portions, and positioning one of each said object identifying portions between pairs of said segments produced by step c;
   i) identifying each of said object identifying portions with a selected object identifying indicia;
   j) imposing a selected one of said object identifying indicia on a selected one of the faces of a said selected one of said plurality of dice.

* * * * *